(12) United States Patent
Wedi

(10) Patent No.: US 8,385,665 B2
(45) Date of Patent: Feb. 26, 2013

(54) IMAGE PROCESSING APPARATUS, IMAGE PROCESSING METHOD, PROGRAM AND SEMICONDUCTOR INTEGRATED CIRCUIT

(75) Inventor: Thomas Wedi, Gross-Umstadt (DE)

(73) Assignee: Panasonic Corporation, Osaka (JP)

( * ) Notice: Subject to any disclaimer, the term of this patent is extended or adjusted under 35 U.S.C. 154(b) by 1194 days.

(21) Appl. No.: 12/293,505

(22) PCT Filed: Mar. 20, 2007

(86) PCT No.: PCT/JP2007/055741
§ 371 (c)(1),
(2), (4) Date: Sep. 18, 2008

(87) PCT Pub. No.: WO2007/108487
PCT Pub. Date: Sep. 27, 2007

(65) Prior Publication Data
US 2009/0274380 A1    Nov. 5, 2009

(30) Foreign Application Priority Data

Mar. 20, 2006    (EP) .................................. 06005663

(51) Int. Cl.
*G06K 9/36*    (2006.01)
*G06K 9/40*    (2006.01)
(52) U.S. Cl. ........ 382/233; 382/232; 382/260; 382/276; 382/235
(58) Field of Classification Search .................. 382/233, 382/235, 260, 254, 276, 278, 279; 348/391.1, 348/392.2, 424.1; 708/422
See application file for complete search history.

(56) References Cited

U.S. PATENT DOCUMENTS

| | | | | |
|---|---|---|---|---|
| 4,707,737 A | * | 11/1987 | Adachi et al. | 348/391.1 |
| 4,819,086 A | * | 4/1989 | Hayashi et al. | 386/275 |
| 5,327,241 A | * | 7/1994 | Ishizu et al. | 348/606 |
| 6,985,641 B1 | | 1/2006 | Michel et al. | |
| 8,023,561 B1 | * | 9/2011 | Garrido et al. | 375/240.15 |
| 2003/0220089 A1 | | 11/2003 | Chang et al. | |
| 2005/0019000 A1 | | 1/2005 | Lim et al. | |
| 2007/0097334 A1 | * | 5/2007 | Damera-Venkata et al. | 353/94 |

FOREIGN PATENT DOCUMENTS

| | | |
|---|---|---|
| EP | 0 132 337 | 1/1985 |
| EP | 1 492 051 | 12/2004 |

(Continued)

OTHER PUBLICATIONS

International Search Report issued May 1, 2007 in the International (PCT) Application of which the present application is the U.S. National Stage.

(Continued)

*Primary Examiner* — Ali Bayat
(74) *Attorney, Agent, or Firm* — Wenderoth, Lind & Ponack, L.L.P.

(57) ABSTRACT

An image processing apparatus includes a filter unit which filters image signals; a sampling unit which generates first digital image signals having a first resolution by sampling the filtered image signals at a predetermined sampling frequency; and a super-resolution unit which reconstructs a second digital image signal having a second resolution which is higher than the first resolution by performing super-resolution on the first digital image signals generated by the sampling unit, wherein the filter unit passes frequency components corresponding to or lower than the Nyquist frequency which is half the sampling frequency, and passes a part of frequency components within a range from the Nyquist frequency to the highest frequency which can be represented by the second resolution.

12 Claims, 15 Drawing Sheets

FOREIGN PATENT DOCUMENTS

| | | |
|---|---|---|
| JP | 2000-339450 | 12/2000 |
| JP | 2005-352720 | 12/2005 |
| WO | 2005/122083 | 12/2005 |

OTHER PUBLICATIONS

T. Takazawa, M. Abe and M. Kawamata, *"Design of a Filter Bank With Desired Frequency Response and Low Aliasing Noise"*, SICE Tohoku Chapter, 215th Workshop, May 27, 2004, No. 215-7.

Supplementary European Search Report (in English language) dated Mar. 16, 2009 issued in European Patent Application No. 07739184.5.

Gordon E. Carlson; *"Signal and Linear System Analysis"*, 1998, John Wiley & Sons, Inc., XP002401930, pp. 363-366.

Supplementary European Search Report (in English language) dated Mar. 24, 2009 issued in European Patent Application No. 07739184.5.

* cited by examiner

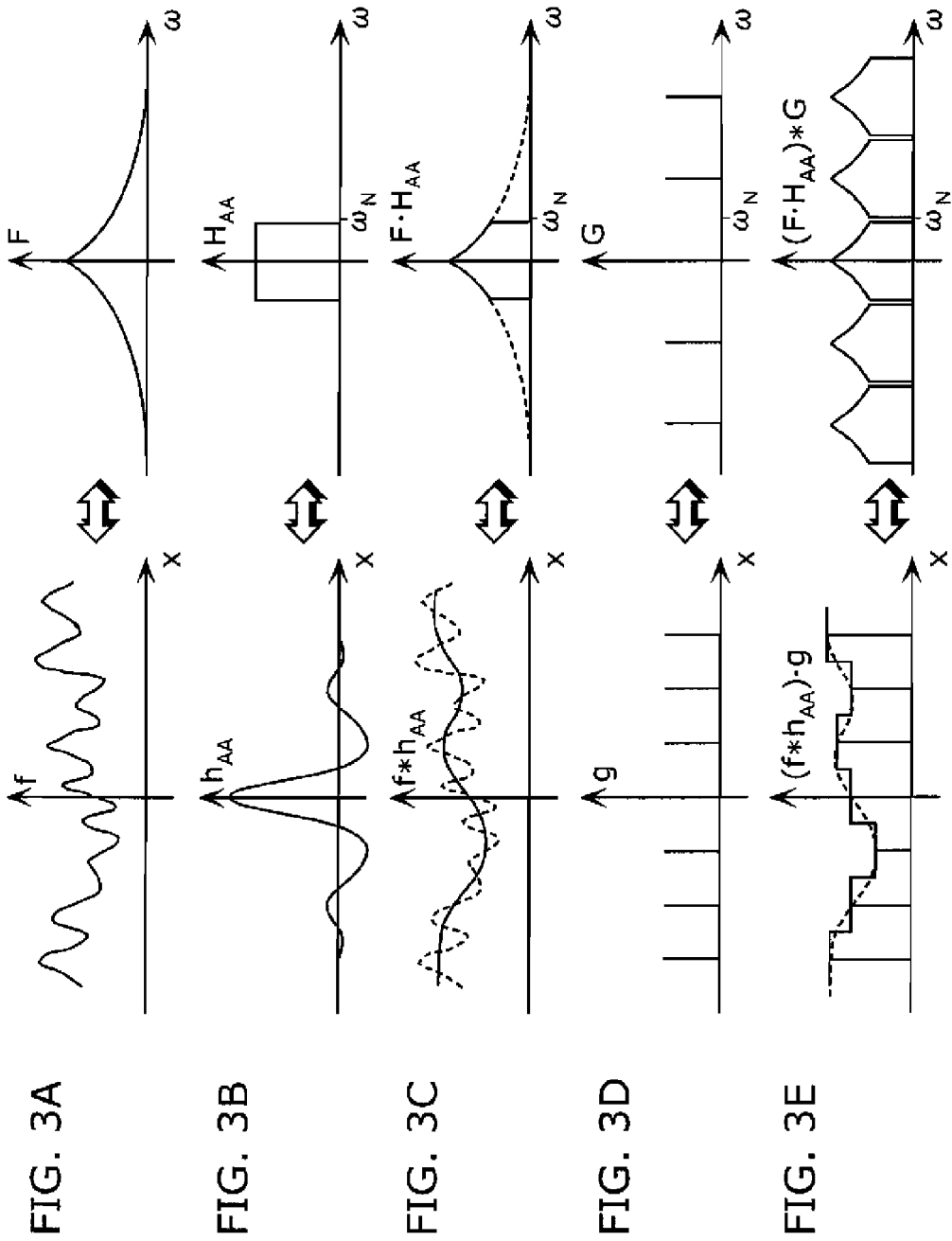

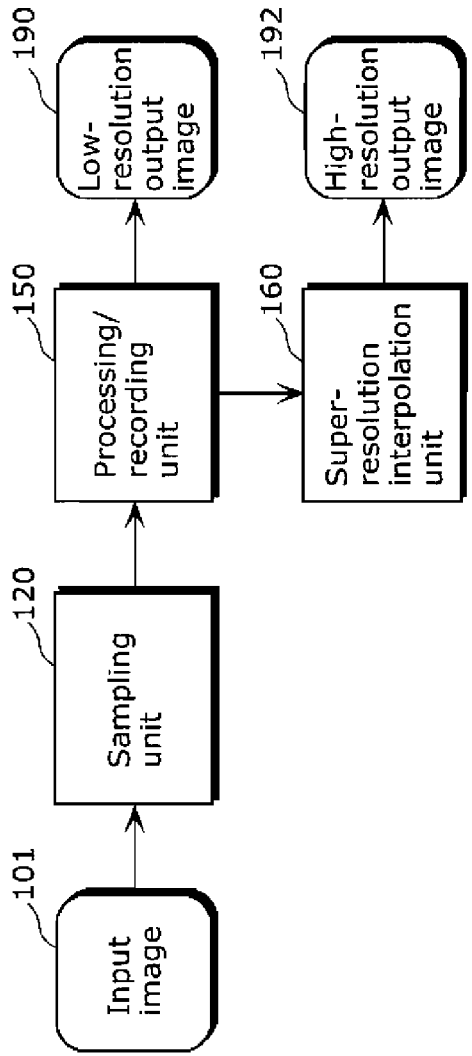
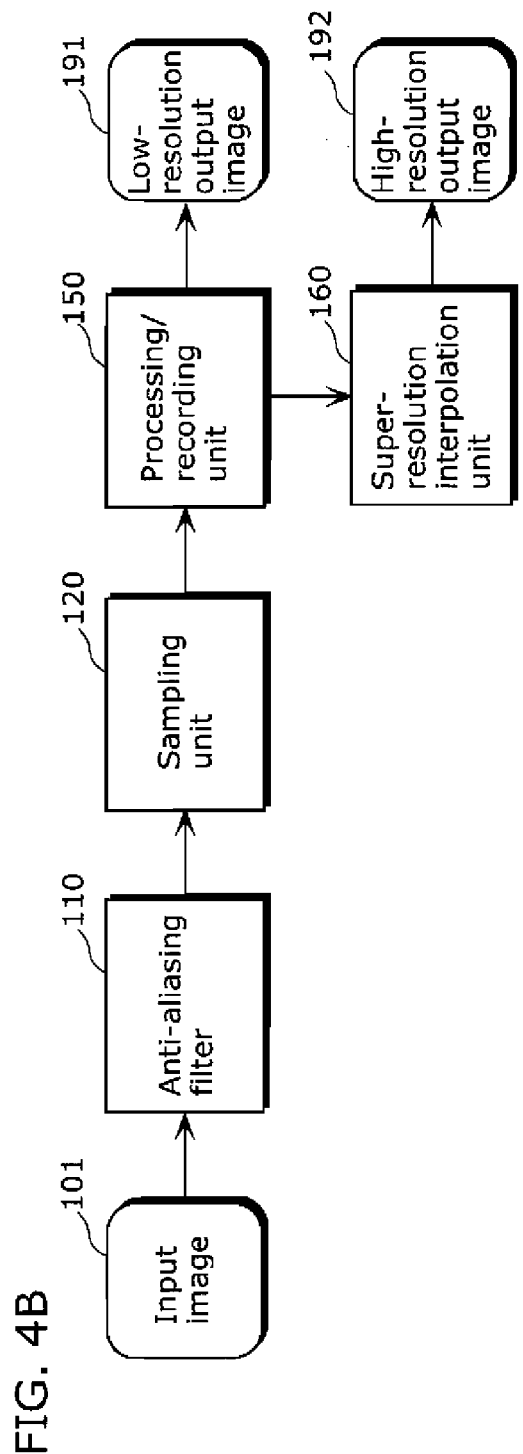
FIG. 4A
FIG. 4B

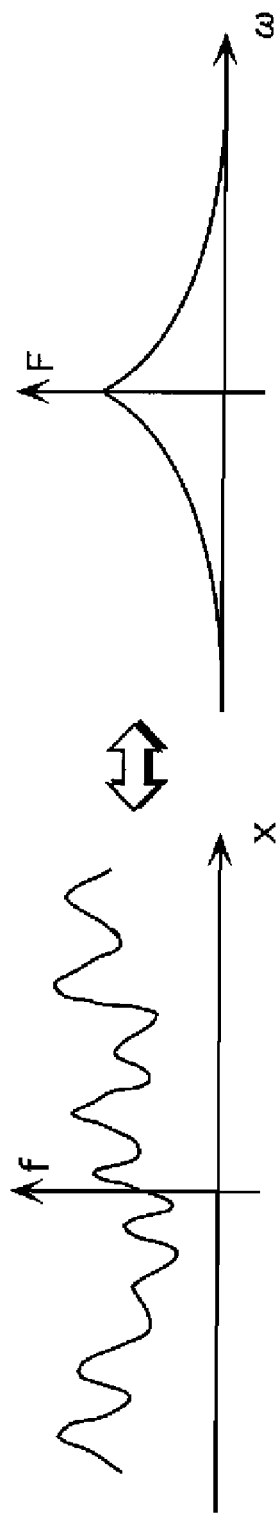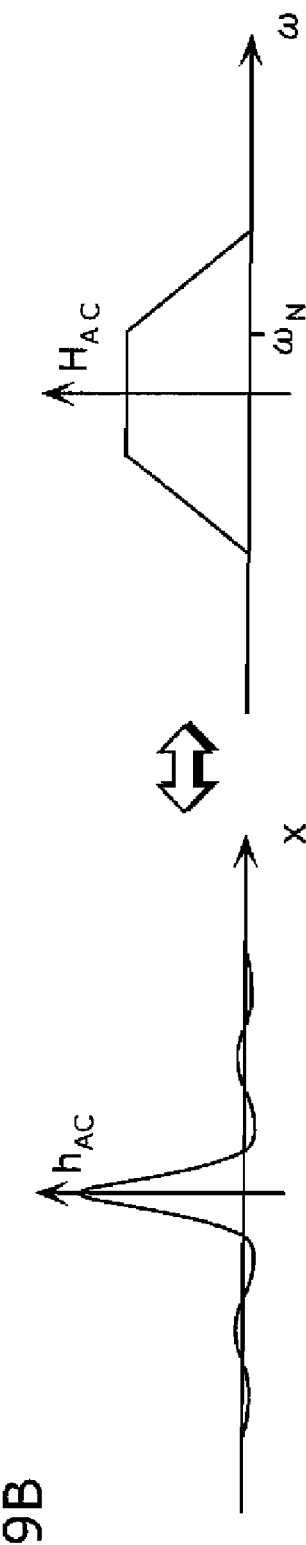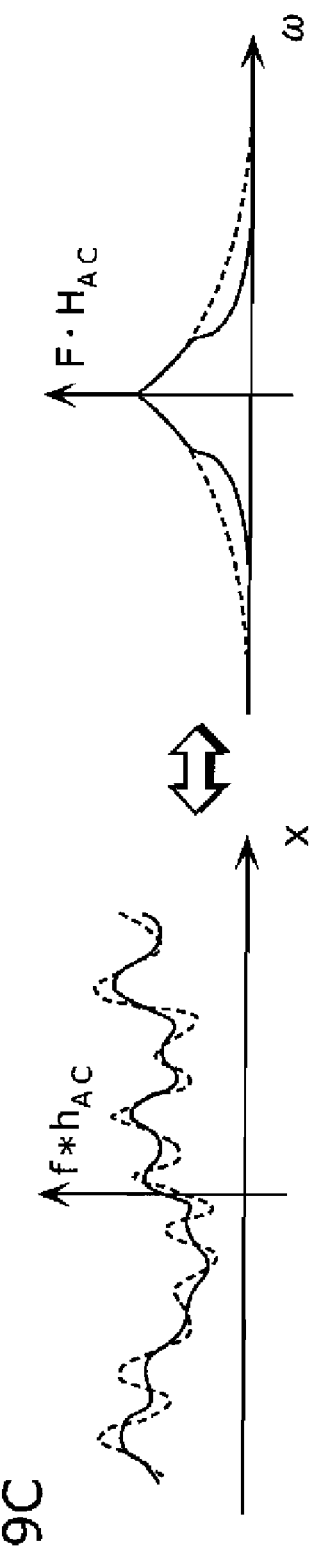

IMAGE PROCESSING APPARATUS, IMAGE PROCESSING METHOD, PROGRAM AND SEMICONDUCTOR INTEGRATED CIRCUIT

BACKGROUND OF THE INVENTION

1. Technical Field

The present invention relates to an image processing apparatus, an image processing method, a program and a semiconductor integrated circuit for reconstructing a high-resolution digital image signal by performing super-resolution interpolation on image signals.

2. Background Art

Recently, methods for converting a sequence of low-resolution images into a high-resolution image or a sequence of high-resolution images have attracted considerable interest among computer scientists and image processing specialists. These methods are commonly referred to as super-resolution, super-resolution interpolation or super-resolution reconstruction. The basic idea behind super-resolution is to exploit motions in low-resolution images at sub-pixel level in order to reconstruct image details that are not apparent from any one of these images by itself.

Super-resolution techniques are particularly interesting in the context of image acquisition, since they provide an efficient method to improve image resolution without employing costly high-performance imaging devices.

FIG. 1A is a block diagram of a conventional image acquisition system.

As shown in FIG. 1A, a sampling unit 120 samples an input image 101 at a predetermined sampling frequency. The processing/recording unit 150 processes it or records it onto a recording medium. In the case where the input image contains video frequencies which are higher than the Nyquist frequency of the sampling unit 120, aliasing, that is, folding noise occurs in the sampled image. This can be avoided by an anti-aliasing filter (folding noise prevention filter) 110 as shown in FIG. 1B. The anti-aliasing filter 110 is a low-pass filter which removes video frequencies exceeding the Nyquist frequency before the sampling. Hence, the conventional image acquisition and reproduction apparatus shown in FIG. 1B outputs an image 190 free of folding noise.

Functions of a conventional anti-aliasing filter 110 are described with reference to FIGS. 2A to 2C and FIGS. 3A to 3E. For simplification, a signal is assumed to be a one-dimensional signal here. In each of the drawings, the left-hand graph shows a signal in a spatial domain. The horizontal axis x shows one-dimensional spatial coordinate or a time axis, and the longitudinal axis shows luminance. Likewise, the right-hand graph shows a signal transformed (Fourier-transformed) into a frequency domain. The horizontal axis ω shows frequency (radian), the longitudinal axis shows frequency strength, and $\omega_N$ shows the Nyquist frequency.

FIG. 2A shows a rapidly varying video signal with an accordingly broad frequency spectrum-F. Sampling this signal can be expressed as a multiplication with a Dirac comb g as represented schematically in FIG. 2B. Note that the Fourier transform of a Dirac comb is also a Dirac comb G. Since multiplication of two signals in the spatial domain corresponds to a convolution of the transformed signals in the frequency domain, the spectrum of the sampled signal F*G takes the form as indicated on the right-hand side of FIG. 2C. In other words, the spectrum F*G of the sampled signal (shown as solid lines) is the sum of the spectra (shown as dashed lines) transformed and replicated periodically.

As shown in FIG. 2C, the transformed and replicated spectra (shown as dashed lines) overlap with each other. The spectral power of the sampled signal at a certain frequency is thus contaminated by contributions from other frequencies that are a so-called alias to the certain frequency. In the spatial domain, aliasing artifacts become clear and apparent noise such as Moiré patterns or jaggy which occurs along smooth edge line portions.

In order to prevent aliasing, it is thus necessary to prevent overlapping of the spectra in the sampling. This can be achieved by band-limiting the initial signal by means of a low-pass filter $h_{AA}$ as shown in FIG. 3B. The anti-aliasing filter 110 has characteristics of the low-pass filter $h_{AA}$.

FIG. 3A represents the video signal f, and FIG. 3B represents the low-pass filter $h_{AA}$ used for band-limiting the signal by convolving the signal in the spatial domain or multiplying the signal in the frequency domain. FIG. 3C shows the result $f*h_{AA}$ of the low-pass filtering (shown as a solid line) in comparison to the video signal f (shown as a dashed line).

As explained above, sampling corresponds to multiplication of the signal with a Dirac comb g in the spatial domain, and to a convolution with the corresponding Dirac comb G in the frequency domain (cf. FIG. 3D). Since the spectrum of the signal has been band-limited, the transformed and replicated spectra $F*H_{AA}$ do no longer overlap with each other (cf. FIG. 3E), so that no aliasing occurs.

Next, conventional image acquisition systems with super-resolution interpolation are illustrated. FIG. 4A is a block diagram of the configuration of the conventional image acquisition system including the sampling unit 120, the processing/recording unit 150, and the super-resolution interpolation unit 160. The input image 101 is sent to the sampling unit 120. The sampling unit 120 generates a digital image by sampling the input image 101 at a predetermined sampling frequency. The processing/recording unit 150 outputs, as a low-resolution output image 191, the digital image at a sampling resolution of the original image. Otherwise, the low-resolution output image is outputted to the super-resolution interpolation unit 160. The super-resolution interpolation unit 160 outputs a high-resolution output image 192 having a resolution which is higher than the original by performing super-resolution interpolation on the low-resolution output image.

FIG. 4B is a block diagram of a conventional image acquisition system similar to the system shown in FIG. 4A but with an additional anti-aliasing filter 110. The system of FIG. 4B is similar to that of FIG. 4A except that the input images are filtered by an anti-aliasing filter 110 before sampling. Hence, the image quality of the low-resolution output images 191 is enhanced since folding noise is removed. However, due to the anti-aliasing filtering, is the high-resolution images 192 which are outputted by the super-resolution interpolation unit 160 do not contain any finer image details than in the low-resolution images.

Super resolution is described with reference to FIG. 5. A conventional super-resolution reconstruction method basically includes two steps. In a first step, motion estimation and registration are performed on the input images. Motion estimation is to estimate a motion in each reference image with respect to corresponding current low-resolution image with sub-pixel precision. Registration is to register reference images on a high-resolution grid 520 corresponding to the current low-resolution image using the estimated motion.

In the second step, nonuniform interpolation techniques can be employed to obtain interpolated values for each point of the high-resolution grid 520 so as to produce a reconstructed high-resolution image 530. This is disclosed in, for example, Patent Reference 1.

Patent Reference 1: Japanese Laid-open Patent Application Publication No. 2000-339450.

SUMMARY OF THE INVENTION

However, according to the conventional technique, the system (FIG. 4B) which includes the anti-aliasing filter 110 entails a problem that the definition of the super-resolution image is decreased, although the system prevents aliasing and makes it easy to perform registration. In contrast, the system (FIG. 4A) which does not include the anti-aliasing filter 110 entails a problem that aliasing occurs even when the definition of the super-resolution image is increased, although the system makes it difficult to perform registration. In other words, the presence of the anti-aliasing filter 110 illuminates that prevention of aliasing and simplification of registration are in a trade-off relationship with increase in the definition of a super-resolution image.

This problem is described below with reference to the drawings.

FIGS. 6A to 6C show effects of super-resolution interpolation in spatial and frequency domains. FIG. 6A shows an under-sampled signal f·g and the corresponding spectrum F*G with aliasing. FIG. 6B illustrates the result of increasing the resolution of the under-sampled signal by means of a conventional interpolation method. Due to the sampling theorem, the under-sampled signal does not contain any information regarding video frequencies which is higher than the Nyquist frequency $\omega_N$. Hence, although the periodicity in the spectrum is reduced due to the up-sampling, the spectrum is zero for frequencies between the Nyquist frequency $\omega_N$ and its alias frequency (shown as a solid line on the right-hand side of FIG. 6B).

Super-resolution interpolation, however, can exploit the folding noise 610 in the up-sampled signal in order to reconstruct video frequencies 620 which is higher than the Nyquist frequency $\omega_N$ of the sampling unit. As shown in FIG. 6C, the thus reconstructed signal resembles a signal that would have been generated by sampling the original signal at the higher resolution in crest portions.

Super-resolution interpolation is not in contradiction to the Sampling Theorem because the additional information is extracted from low-resolution images with sub-pixel shifts as described above. Summarizing, super-resolution interpolation can sort out aliasing components in the frequency domain and fill the gap exceeding the Nyquist frequency so as to reconstruct image details at a resolution that are not apparent from any of the low resolution images taken for itself. Hence, folding noise is important for super-resolution interpolation.

On the other hand, folding noise may severely hamper motion estimation. A well known example of this problem is a carriage's spoke wheels, which appear to rotate in the wrong direction in a Western film. Although this adverse effect is rather due to aliasing in the temporal domain, the same problem arises with under-sampling in the spatial domain. Therefore, it may be necessary to employ anti-aliasing filtering in order to be able to perform motion estimation, which is a prerequisite for super-resolution interpolation.

FIG. 7A illustrates the effect of employing an anti-aliasing filter as shown in FIG. 1B. FIG. 7A exhibits the anti-aliasing filtered and sampled signal of FIG. 3E. Up-sampling this signal, i.e., adding additional sampling points r, leads to the spectrum shown on the right-hand side of FIG. 7B. Similar to the previous example of FIG. 6B, the periodicity of the signal in the frequency domain is reduced leaving a gap exceeding the Nyquist frequency $\omega_N$ and its alias. In contrast to the previous example, however, high video frequencies have been removed by the anti-aliasing filter and thus have not been folded over to produce aliasing components. Hence, information related to these frequencies is irrevocably lost and cannot be reconstructed.

Digital image acquisition systems usually suffer from a limitation of the resolution provided by the imaging device. Apart from practical restrictions with respect to details that can or cannot be discerned in the sampled image, the limited sampling resolution can also lead to disturbing artifacts, such as Moiré patterns. These artifacts are a consequence of sampling an original image containing fine patterns with a resolution that is not high enough to faithfully reproduce these patterns. This is an example of the well-known effect of aliasing in undersampled signals. Therefore, conventional digital image acquisition systems apply an anti-aliasing filter before sampling the image in order to prevent these disturbing artifacts. The anti-aliasing filter basically blurs the original image so as to remove those patterns that are too fine to be sampled anyway and thus prevents formation of Moiré patterns. In this conventional approach, however, details removed by the anti-aliasing filter are permanently lost and cannot be reconstructed by super-resolution techniques.

The present invention has an object of providing an image processing apparatus, an image processing method, a program, and a semiconductor integrated circuit for achieving both (i) prevention of aliasing and simplification of registration and (ii) enhancement of the definition of a super-resolution image.

In order to solve the above problem, the image processing apparatus of the present invention includes a filter unit which filters image signals; a sampling unit which generates first digital image signals having a first resolution by sampling the filtered image signals at a predetermined sampling frequency; and a super-resolution unit which reconstructs a second digital image signal having a second resolution which is higher than the first resolution by performing super-resolution interpolation on the first digital image signals generated by the sampling unit, wherein the filter unit passes frequency components corresponding to or lower than the Nyquist frequency which is half the sampling frequency, and passes a part of frequency components within a range from the Nyquist frequency to the highest frequency which can be represented by the second resolution. As described above, the present invention takes a unique scheme of leaving, under control, a part of video frequencies exceeding the Nyquist frequency of a sampling resolution. This makes it possible to achieve both (i) prevention of aliasing and simplification of registration and (ii) enhancement of the definition of a super-resolution image.

Here, the image processing apparatus may further include an inverse filter unit which has a filter characteristic which is inverse to a filter characteristic of the filter unit and to filter the second digital image signal.

Here, the inverse filter unit may attenuate the frequency components corresponding to or lower than the Nyquist frequency, and pass the part of frequency components within the range from the Nyquist frequency to the highest frequency which can be represented by the second resolution.

Here, the inverse filter unit may pass the frequency components corresponding to or lower than the Nyquist frequency, and emphasize frequency components corresponding to or higher than the Nyquist frequency.

The inverse filter unit structured like this can enlarge high-frequency components in digital images having the second resolution attenuated by the filter unit, in other words, can obtain an image signal having the second resolution representing sharper image details.

Preferably, filter characteristics of aliasing control filters are adaptively set depending on the content of an input image. The attenuation coefficient optimum for an aliasing control filter depends on the content of the input image. In other words, it depends on the amount of fine details in video frequencies close to the Nyquist frequency. Leaving information for performing super-resolution interpolation as much as possible using aliasing control filters for the content of the input image leads to a reduction in the amount of folding noise in low-resolution digital images.

Here, the filter unit may have a filter characteristic of having an attenuation slope in the range from the Nyquist frequency to the highest frequency, and have a filter characteristic of attenuating, to 0, a frequency component corresponding to the highest frequency.

Here, it is preferable that digital image signals having the first resolution correspond to a sequence of frames. In this case, the low-resolution first image signals can be easily recorded using a video camera. Further, the video sequence recorded by the video camera contains sub-pixel shifts between the frames. This is basic preparation for performing super-resolution.

Here, the super-resolution unit may reconstruct high-resolution digital images. The high-resolution second digital images correspond to high-resolution digital images reconstructed from the video sequence. In this way, it becomes possible to record a low-resolution video sequence and generate a high-resolution version having the same content.

In addition, the image processing method, the program and the semiconductor integrated circuit according to the present invention have the same structure as described above.

With the image processing apparatus according to the present invention, it becomes possible to achieve both (i) prevention of aliasing and simplification of registration and (ii) enhancement of the definition of a super-resolution image. Further, it becomes possible to enlarge high-frequency components in digital images having high-resolution (the second resolution) through super resolution, in other words, to obtain a high-resolution image signal representing sharper image details.

BRIEF DESCRIPTION OF DRAWINGS

FIG. 3A is a diagram of an input signal in a spatial domain and a frequency domain.

FIG. 3B is a diagram of a low pass filter in the spatial domain and the frequency domain.

FIG. 3C is a diagram of the low-pass filtered input signal in the spatial domain and the frequency domain.

FIG. 3D is a diagram of a Dirac comb, as it is used in the sampling step, in the spatial domain and the frequency domain.

FIG. 3E is a diagram of the low-pass filtered input signal in the spatial domain and the frequency domain.

FIG. 4A is a block diagram of a conventional image acquisition system with super-resolution interpolation.

FIG. 4B is a block diagram showing the structure of a conventional image acquisition system with super-resolution interpolation and anti-aliasing filtering.

FIG. 9A is a diagram of an input signal in a spatial domain and a frequency domain.

FIG. 9B is a diagram of a low pass filter in the spatial domain and the frequency domain according to the embodiment of the present invention.

FIG. 9C is a diagram of the low-pass filtered input signal in the spatial domain and the frequency domain according to the embodiment of the present invention.

Figure 1A:
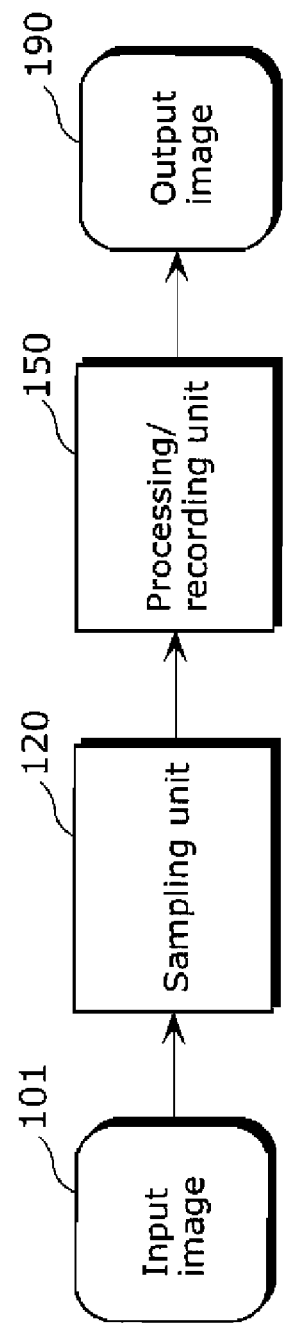
FIG. 1A is a block diagram showing the structure of a conventional image acquisition system.
Figure 1B:
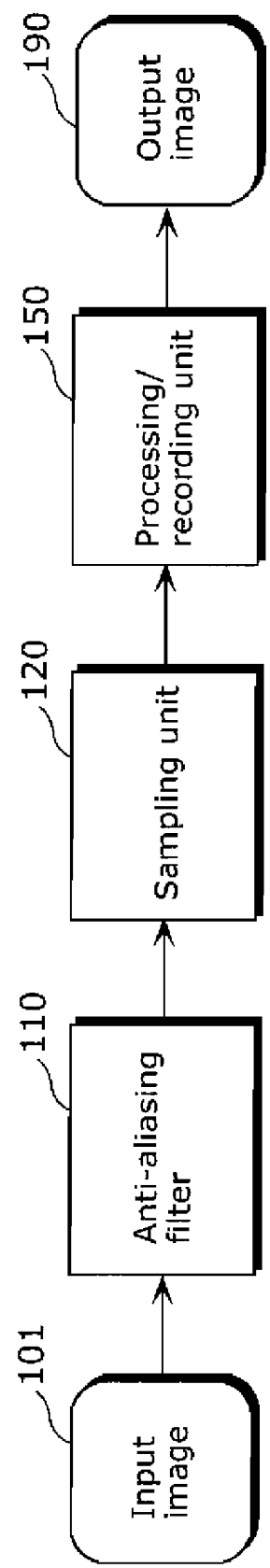
FIG. 1B is a block diagram showing the structure of a conventional image acquisition system with anti-aliasing filtering.
Figure 2A:
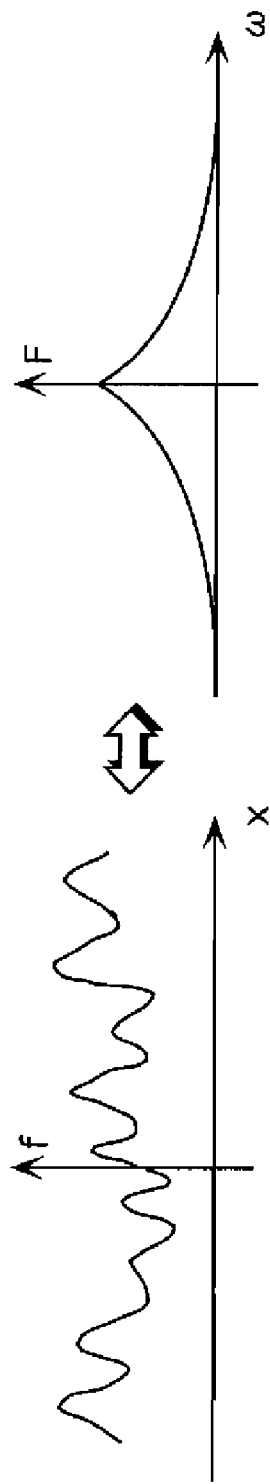
FIG. 2A is a diagram of an input signal in a spatial domain and a frequency domain.
Figure 2B:
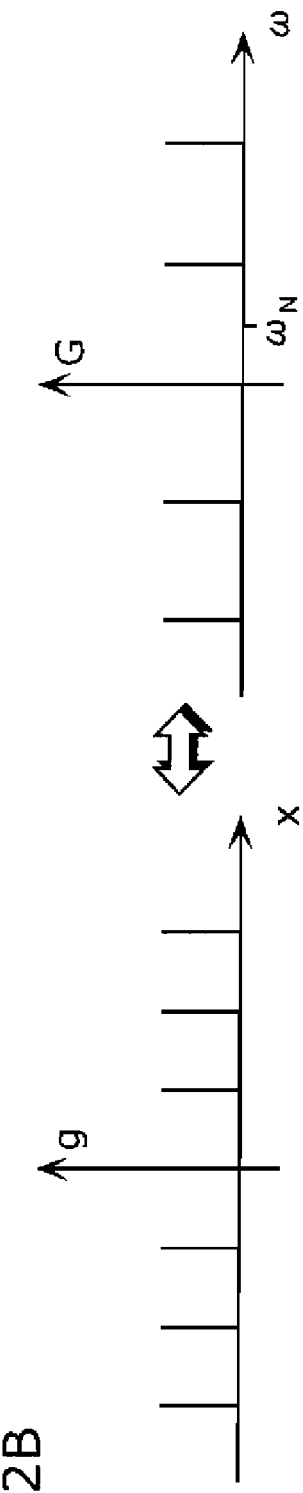
FIG. 2B is a diagram of a Dirac comb, as it is used in the sampling step, in the spatial domain and the frequency domain.
Figure 2C:
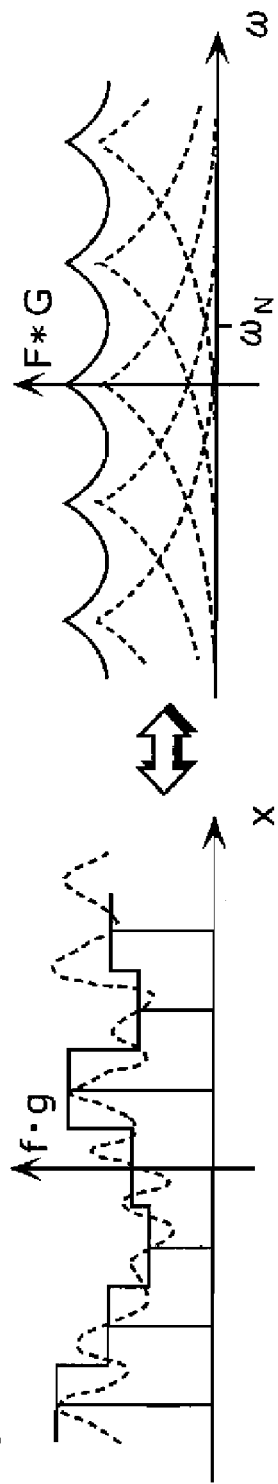
FIG. 2C is a diagram of the sampled input signal in the spatial domain and the frequency domain.

NUMERICAL REFERENCES 101 input image
110 anti-aliasing filter
120 sampling unit
150 processing/recording unit
160 super-resolution interpolation unit
190, 191 low-resolution output image
192 high-resolution output image
520 grid
530 high-resolution image
610 noise
620 video frequency
1001 input image
1002 high-resolution input image
1010 aliasing control filter
1020 sampling unit
1021 down-sampling unit
1051, 1052, 1053 coding unit
1054, 1055 adder
1056, 1057 decoder
1060 super-resolution interpolation unit
1070 de-attenuation filter
1091, 1098 low-resolution output image
1092, 1099 high-resolution output image
1095, 1096 bitstream

DETAILED DESCRIPTION OF THE INVENTION

An image processing apparatus in an embodiment according to the present invention includes a filter unit which filters image signals; a sampling unit which generates first digital image signals having a first resolution by sampling the filtered image signals at a predetermined sampling frequency; and a super-resolution unit which reconstructs a second digital image signal having a second resolution which is higher than the first resolution by performing super-resolution on the first digital image signals generated by the sampling unit.

Here, the filter unit functions as an anti-alias control filter, not as a simple anti-alias filter. The filter unit as the anti-alias control filter passes frequency components corresponding to or lower than the Nyquist frequency which is half the sampling frequency, and passes a part of frequency components within a range from the Nyquist frequency to the highest frequency which is can be represented by the second resolution. In other words, the filter unit does not remove all of the frequencies exceeding the Nyquist frequency, and passes a part of frequency components within a range from the Nyquist frequency to a highest frequency which can be represented by the second resolution. The frequency components within the range from the Nyquist frequency to the highest frequency are essential to enhance the definition by performing super resolution although it causes aliasing. The video frequencies exceeding the Nyquist frequency is not removed but attenuated in order to reduce disturbing folding noise in the low-resolution output image 1091. The definition of the image sampled and recorded in this way can be further enhanced by the super-resolution interpolation unit 1060 for generating a high-resolution output image having a resolution which is higher than the sampling resolution. In addition, since the frequency components causing aliasing are attenuated, it is possible to increase accuracy in registration without deteriorating the accuracy in motion estimation in super resolution.

In addition, the image processing apparatus further has inverse filter characteristics. The inverse filter unit filters a second digital signal, and has filter characteristics which are inverse to the filter characteristics of the filter unit. Hence, the inverse filter unit can enlarge or emphasize high-frequency components in the second digital image with the second resolution attenuated by the filter unit. In other words, an image signal having the second resolution representing sharper image details can be generated.

Figure 8:
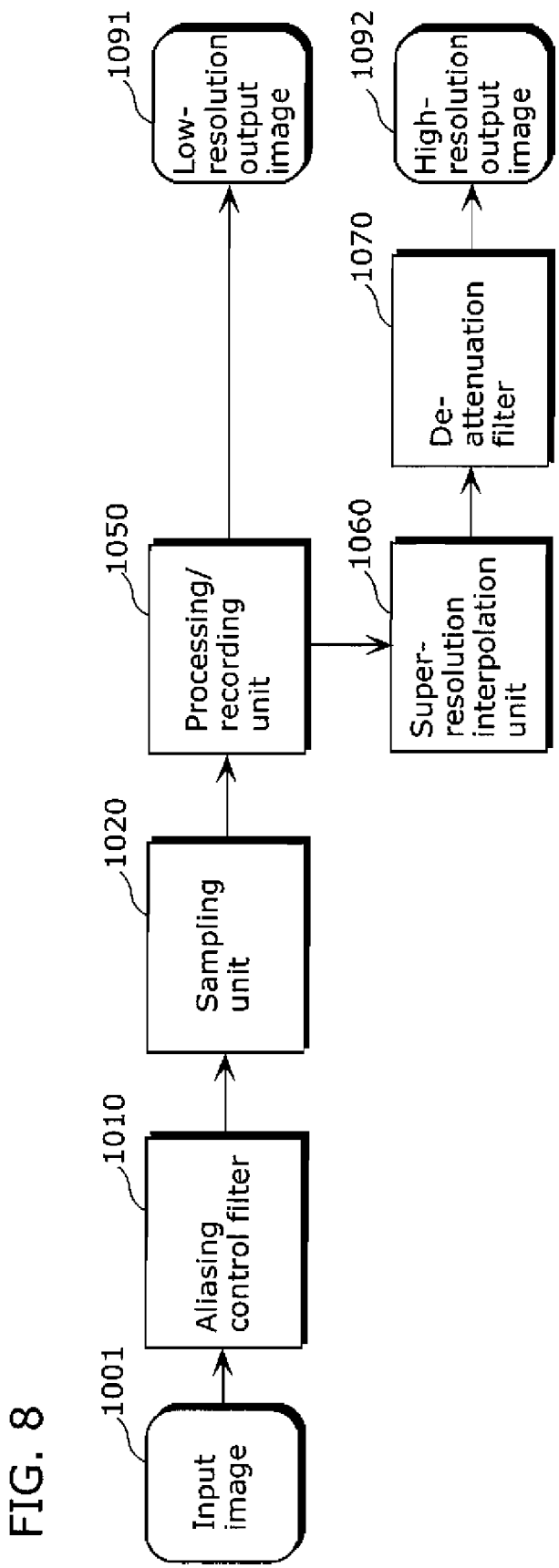
FIG. 8 is a block diagram showing the structure of an image processing apparatus according to an embodiment of the present invention.

FIG. 8 is a block diagram showing an exemplary structure of the image processing apparatus in an embodiment according to the present invention. The image processing apparatus in the drawing includes an aliasing control filter 1010, a sampling unit 1020, a processing/recording unit 1050, a super-resolution interpolation unit 1060, and an inverse attenuation filter 1070.

The input images 1001 are inputted to an aliasing control filter 1010 before sampling. Input images may either be analogue images produced by an optical system or high-resolution digital images transmitted from another imaging device and the like.

In order to allow for super-resolution interpolation of the sampled images, the aliasing control filter 1010, which corresponds to the filter unit, does not remove all the frequencies exceeding the Nyquist frequency of the sampling unit 1020. Instead, video frequencies above the Nyquist frequency are attenuated in order to reduce disturbing folding noise in the low-resolution output images 1091.

For example, the aliasing control filter 1010 may be mounted in form of an optical (blurring) filter used in the upstream of an image sensor, and may be implemented in form of a digital filter which operates on digital image information having an input resolution which is higher than the sampling resolution. In the former case, the sampling unit 1020 may be a digital image sensor such as a CCD. In the latter case, the sampling unit 1020 may be the same as the aliasing control filter 1010 in a sense that the aliasing control filter 1010 generates an image by filtering and down-sampling the input image 1001.

The sampling unit 1020 generates digital image signals having a first resolution (referred to as a low resolution hereinafter) by sampling the filtered image signal at a predetermined sampling frequency.

The processing/recording unit 1050 outputs, as a low-resolution output image 1091, a low-resolution digital image from the sampling unit 1020, and outputs it to the super-resolution interpolation unit 1060. In addition, the process/recording unit 1050 may further process the digital image or record it onto a recording medium.

The super-resolution interpolation unit 1060 reconstructs a digital image signal having a second resolution (referred to as a high resolution hereinafter) which is higher than a first resolution by performing super resolution on low-resolution digital image signals outputted by the processing/recording unit 1030.

The de-attenuation filter 1070 functions as the inverse filter unit, and filters the high-resolution image from the super resolution interpolation unit 1060.

Moreover, the low-resolution output images 1091 and/or the reconstructed high-resolution output images 1092 may be outputted by means of an output unit. The output unit may be connected to a display device for displaying the output images, a storage device for storing the output images, an encoder/transmitter for encoding and transmitting the output images over a communications line, or an image processing unit such as an image recognition or motion estimation unit, etc.

Whether only low-resolution, only high-resolution, or both low- and high-resolution output images are outputted via the output unit may depend on requirements and capabilities of a down-stream device, such as display resolution, storage capacity, transmission bandwidth, computational performance, etc.

Next, operations of the image processing apparatus are described in detail with reference to the drawings.

Functions of the aliasing control filter 1010 are described with reference to FIGS. 9A to 9C. For simplification, signals are assumed to be one-dimensional signals here. In each of the drawings, the left-hand side graph shows a signal in the spatial domain. The horizontal axis x shows a one-dimensional spatial coordinate or a time axis, and the longitudinal axis shows luminance. On the other hand, the right-hand side graph shows a signal transformed (Fourier transformed) in the frequency domain. The horizontal axis ω shows frequency (radian), the longitudinal axis shows the strength of frequency components of the signal, and $\omega_N$ shows the Nyquist frequency.

FIG. 9A shows an input signal f. FIG. 9B shows a characteristic $h_{Ac}$ of the aliasing control filter 1010. FIG. 9C shows $f*h_{Ac}$ which is the result of filtering the input image 1001 using the aliasing control filter 1010.

Note that the aliasing control filter 1010 does not totally remove frequencies exceeding the Nyquist frequency $E^{)}N$ in the sampling unit 1020. Instead, high image frequencies are maintained (no attenuation) at the Nyquist frequency, and attenuated by a frequency-dependent attenuation coefficient down to zero (removal) at a frequency corresponding to the highest image frequency that can be represented by the resolution of the super-resolution interpolation unit. Consequently, the impulse response $h_{AC}$ of this filter in the spatial domain is narrower than the impulse response $h_{AA}$ of the anti-aliasing filter shown in FIG. 3B. The input signal filtered by the aliasing control filter 1010 thus still contains image frequencies exceeding the Nyquist frequency (cf. FIG. 9C).

Figures 13A, 13B, 13C:
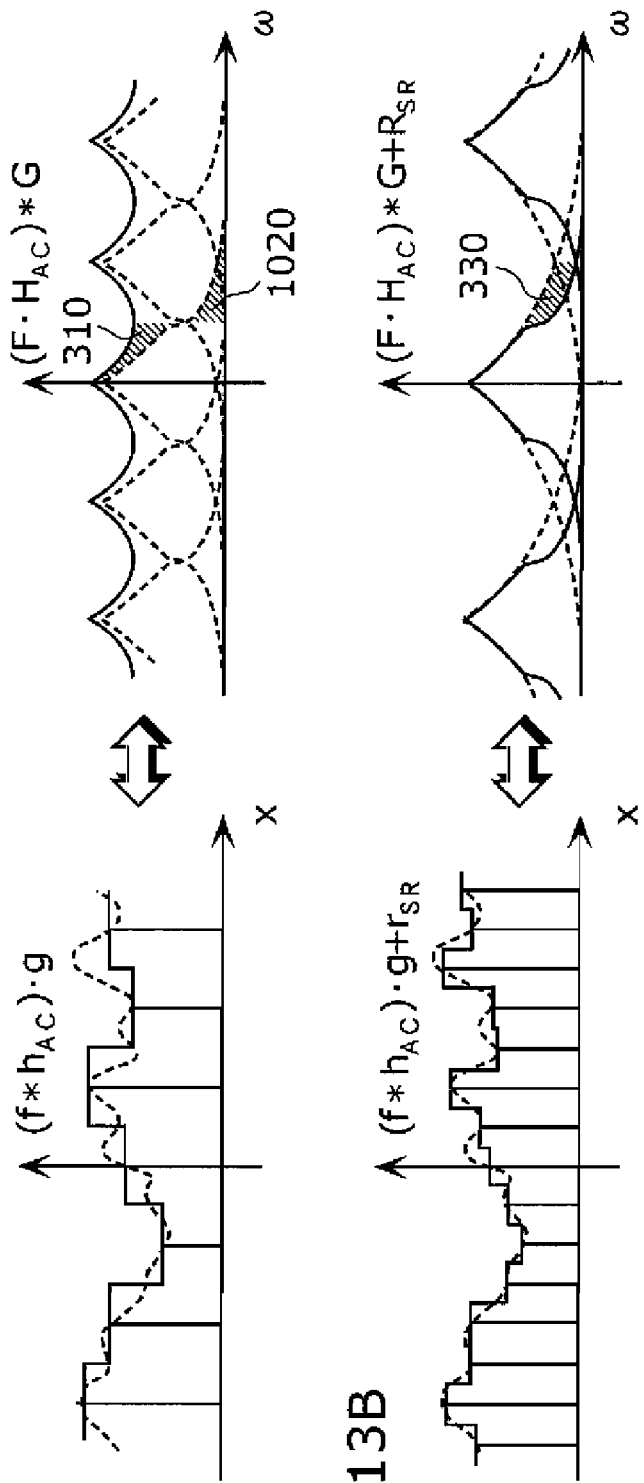
FIG. 13A is a diagram of the low-pass filtered and sampled input signal in a spatial domain and a frequency domain according to the embodiment of the present invention.
FIG. 13B is a diagram of super-resolution interpolation performed in the spatial domain and the frequency domain according to the embodiment of the present invention.
FIG. 13C is a diagram of the de-attenuation filtered and super-resolution interpolated input signal in the spatial domain and the frequency domain according to the embodiment of the present invention.

FIG. 13A shows the result of sampling input images filtered by the aliasing control filter 1010. FIG. 13A is analogous to FIG. 3E, but different in that a part of image frequencies exceeding the Nyquist frequency is left. Because of the presence of image frequencies which is higher than the Nyquist frequency, the spectra of the filtered input signal overlap with each other, and weak aliasing occurs (cf. the shaded areas 310 and 320 in FIG. 13A). Due to the aliasing control filter 1010, however, the amplitude of the folding noise is reduced accordingly. Hence, the thus generated low-resolution images exhibit an improved image quality as compared to the low-resolution images outputted by the conventional image acquisition system shown in FIG. 4A.

Moreover, due to the suppression of folding noise, motion can be estimated more accurately at a sub-pixel level, which is required for the registration of super-resolution interpolation. The remaining folding noise can be exploited by the super-resolution interpolation unit 1060 to extract image details at a resolution superior to the sampling resolution. Ideally, aliasing in the frequency domain can be completely resolved leading to the reconstructed signal shown as a solid line in FIG. 13B.

However, the reconstructed signal still suffers from an attenuation of high frequency components introduced by the aliasing control filter 1010 (the shaded area 330). This is corrected by the de-attenuation filter 1070 that amplifies those image frequencies so as to compensate the effect of the aliasing control filter 1010. As a result, the original input signal can be reconstructed at a high resolution (cf. FIG. 13C).

In this description, the de-attenuation filter 1070 is described as being a separate device accepting the output of the super-resolution interpolation unit 1060. However, the present invention is not restricted in this respect. Alternatively, the de-attenuation filter may as well be a part of the super-resolution interpolation unit 1060, in particular a part of its observation model for generating the observed low-resolution images from the original input signal.

Figure 11A:
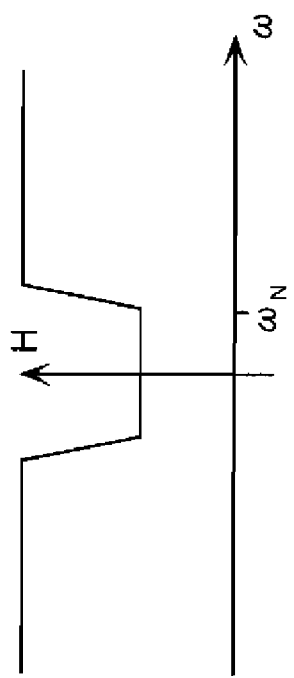
FIG. 11A shows the filtering characteristics of an exemplary aliasing control filter.
Figure 11B:
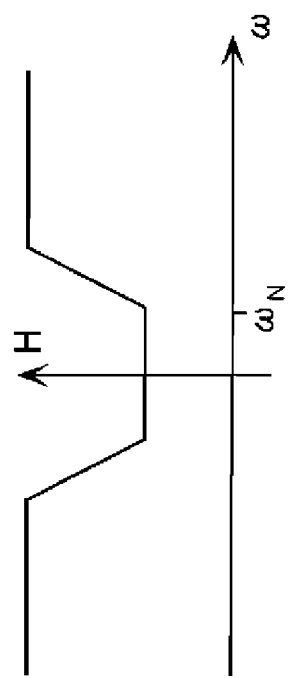
FIG. 11B shows the filtering characteristics of an exemplary aliasing control filter.
Figure 11C:
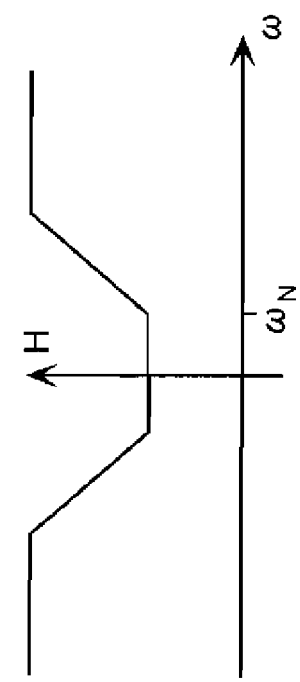
FIG. 11C shows the filtering characteristics of an exemplary aliasing control filter.

The characteristics of the aliasing control filter 1010 shown in FIG. 9B is a mere example, and not supposed to restrict the present invention. As shown in FIGS. 11A to 11C, the aliasing control filter 1010 capable of switching among various types of filter characteristics may be employed in order to achieve the aim of the present invention. Preferably, the filter has a constant gain up to the Nyquist frequency, and a certain attenuation rate exceeding the frequency. The optimum damping factor for frequencies exceeding the Nyquist frequency may depend on the image content. The filter characteristics of FIGS. 11A to 11C may be adaptively switched. Preferably, such attenuation rate is set that leaves high-frequency components strong enough to prevent folding noise. Otherwise, attenuation rate is preferably as weak as possible, i.e., the attenuation rate should be a value equal to or less than 1, in order to leverage super-resolution interpolation by the super-resolution interpolation unit 1060.

Experiments have shown that the attenuation rate for frequencies exceeding the Nyquist frequency is preferably about 0.1 to 0.5.

Figure 10:
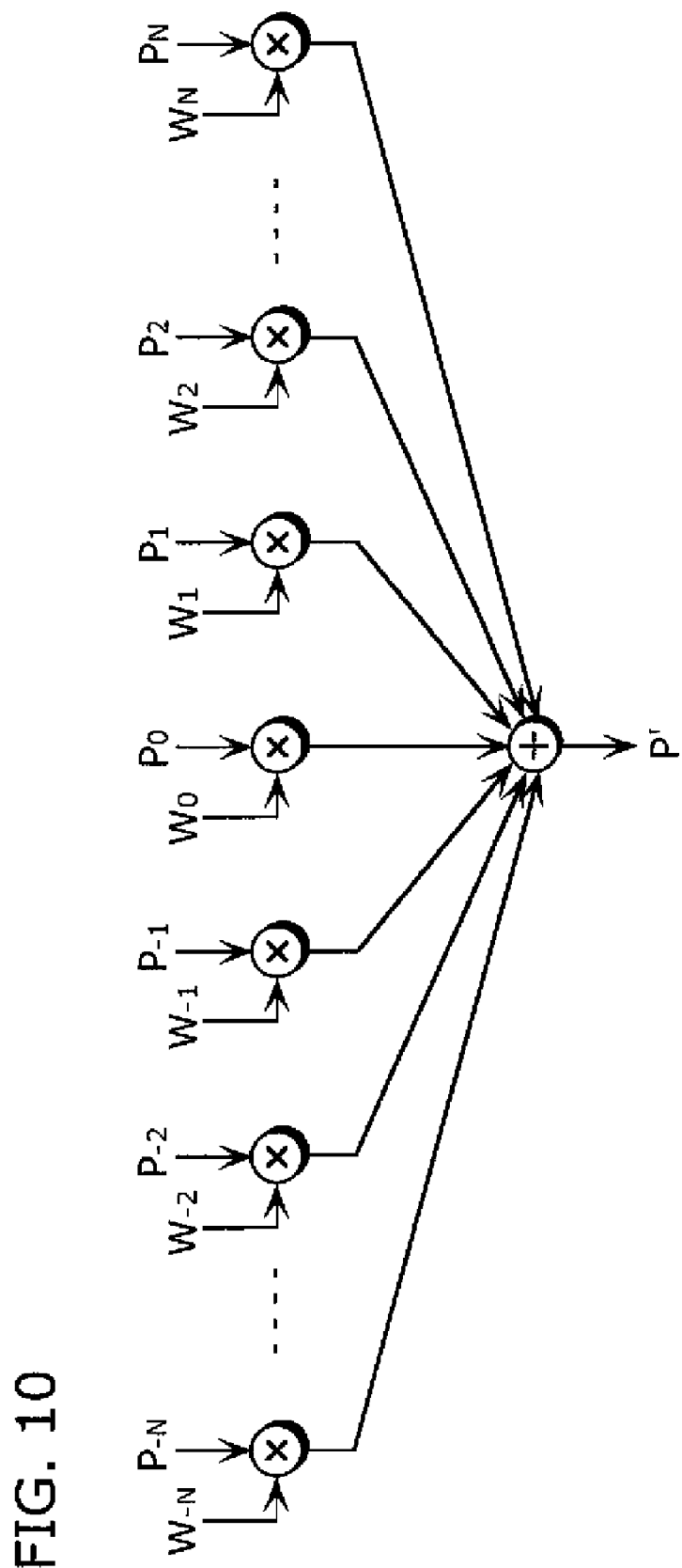
FIG. 10 is a diagram illustrating an example of the structure of a de-attenuation filter.

The aliasing control filter 1010 may be a filter which samples analog image signals, or may be a filter which down-samples digital image signals. FIG. 10 is a diagram of an exemplary structure of the aliasing control filter 1010 corresponding to the latter. The aliasing control filter 1010 in the drawing includes (2N+1) multipliers and an adder. Inputted into the (2N+1) multipliers are consecutive (2N+1) pixels (sample) $P_{-N}$ to $P_N$ and (2N+1) weight coefficients (tap coefficients) $W_{-N}$ to $W_N$. The filter characteristics are determined depending on how such weight coefficients are combined. The adder adds the results of the (2N+1) multiplications, and outputs a new pixel P' corresponding to $P_0$. A set of new pixels P' forms a low-resolution image.

The de-attenuation filter 1070 has filter characteristics which are inverse to the filter characteristics of the aliasing control filter 1010. Thus, the de-attenuation filter 1070 has a single gain up to the Nyquist frequency, and a certain emphasis characteristic for frequencies exceeding the Nyquist frequency. Preferably, the gain in a frequency exceeding the Nyquist frequency is between 2 to which corresponds to the attenuation coefficient of the aliasing control filter 1010.

Figure 12A:
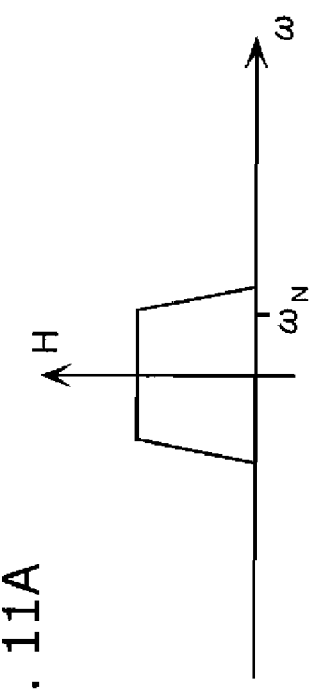
FIG. 12A shows the filtering characteristics of an exemplary de-attenuation filter.
Figure 12B:
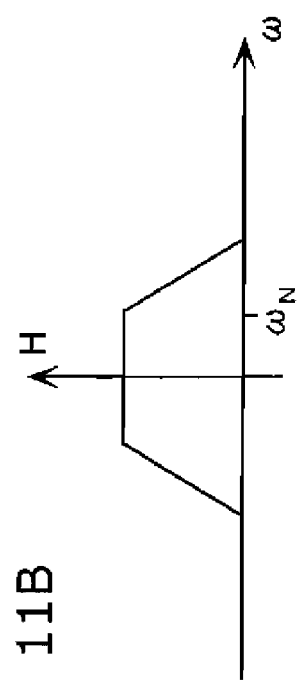
FIG. 12B shows the filtering characteristics of an exemplary de-attenuation filter.
Figure 12C:
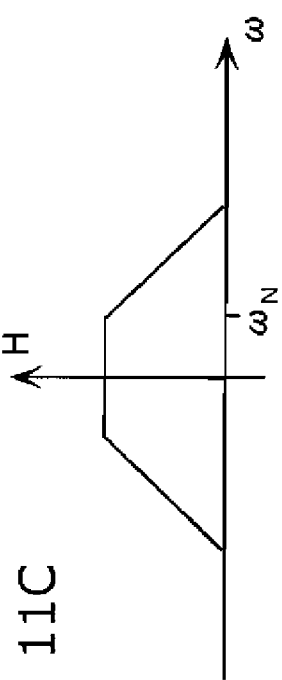
FIG. 12C shows the filtering characteristics of an exemplary de-attenuation filter.

Each of FIGS. 12A to 12C shows the characteristics, of a de-attenuation filter 1070, which are inverse to the filter characteristics in a corresponding one of FIGS. 11A to 11C. The de-attenuation filter 1070 can switch among such filter characteristics working with the aliasing control filter 1010, pass frequency components less than the Nyquist frequency (gain 1), and emphasize the frequency components greater than the Nyquist frequency (gains 2 to 10). The de-attenuation filter 1070 can be structured in form of a circuit as shown in FIG. 10. The filter characteristics which are inverse to the filter characteristics of the aliasing control filter 1010 are determined depending on how these weight coefficients are combined.

Note that the de-attenuation filter 1070 may be structured to attenuate frequency components less than the Nyquist frequency (for example, a constant gain of 0.5) and pass a part of frequency components within a range from the Nyquist frequency to the highest frequency which can be represented by the second resolution (for example, gain 1).

Figure 14A:
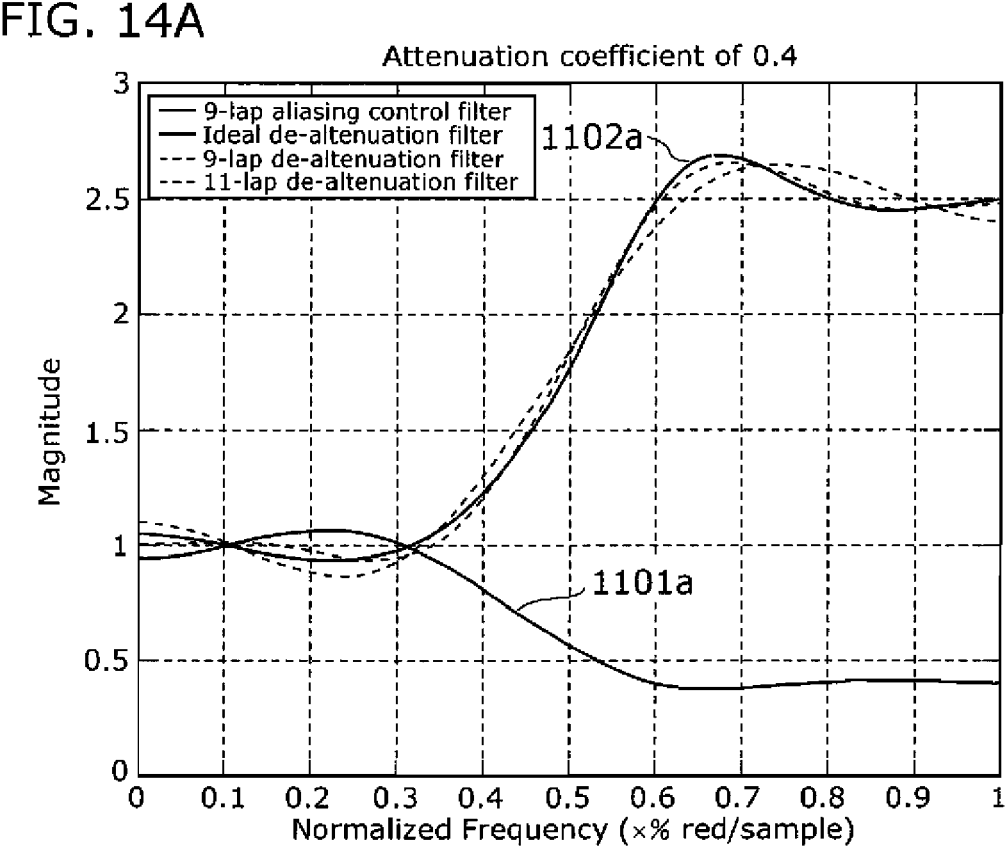
FIG. 14A illustrates aliasing control and the filter characteristics of a de-attenuation filter having an attenuation coefficient of 0.4 according to the embodiment of the present invention.
Figure 14B:
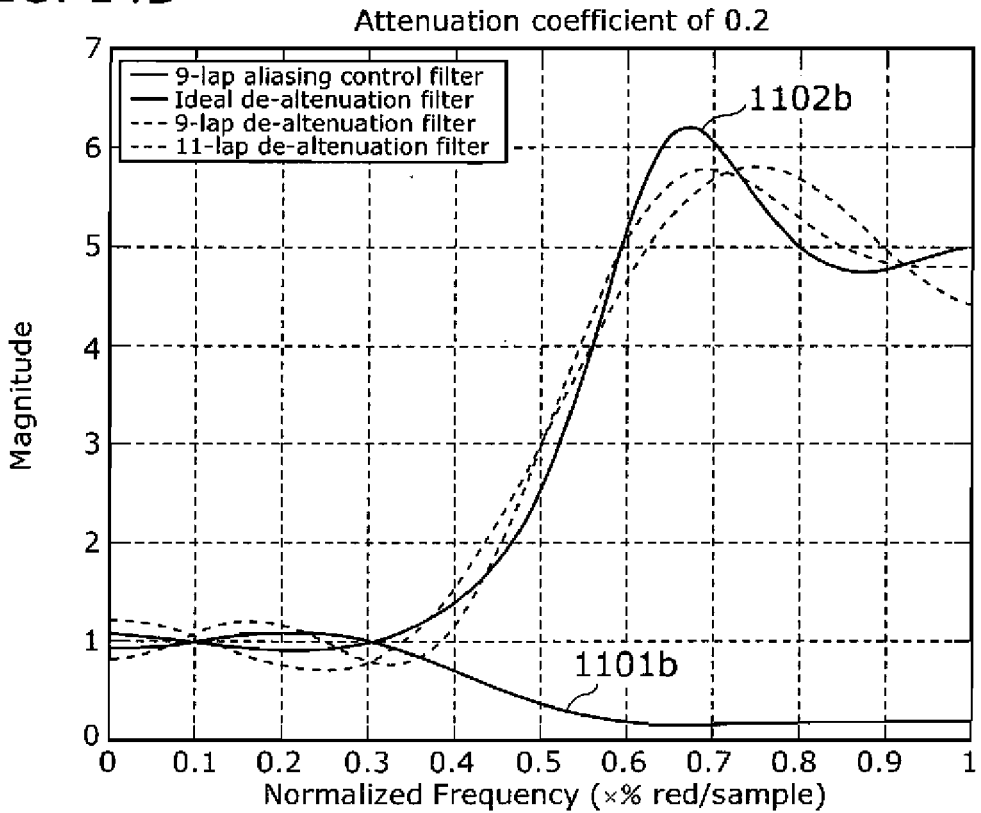
FIG. 14B illustrates aliasing control and the filter characteristics of a de-attenuation filter having an attenuation coefficient of 0.2 according to the embodiment of the present invention.

Technically, both the aliasing control filter 1010 and the de-attenuation filter 1070 are implemented preferably as finite impulse response filters. FIGS. 14A and 14B show two examples of 9-tap aliasing control filters 1010 with attenuation rates 0.4 (1101a in FIG. 14A) and 0.2 (1101b in FIG. 14B), respectively, as well as the corresponding ideal de-attenuation filters (1102a, 1102b) and their finite (9-tap or 11-tap) implementations (shown as dashed lines in FIGS. 14A and 14B).

A description is given of the image processing apparatus, focusing on a current image among low-resolution images. So far, the present invention has been described in terms of acquiring, processing, and reproducing single images. However, the present invention is not restricted to single-image applications, but rather may also be applied to acquisition, processing and reproduction of sequences of images, i.e., to video applications, or is to multiview images, i.e., to images or videos recorded simultaneously from the same scene but from different angles.

Next, a preferred embodiment of the present invention in the context of video coding apparatus is described next, with reference to FIGS. 15 and 16.

Figure 15:
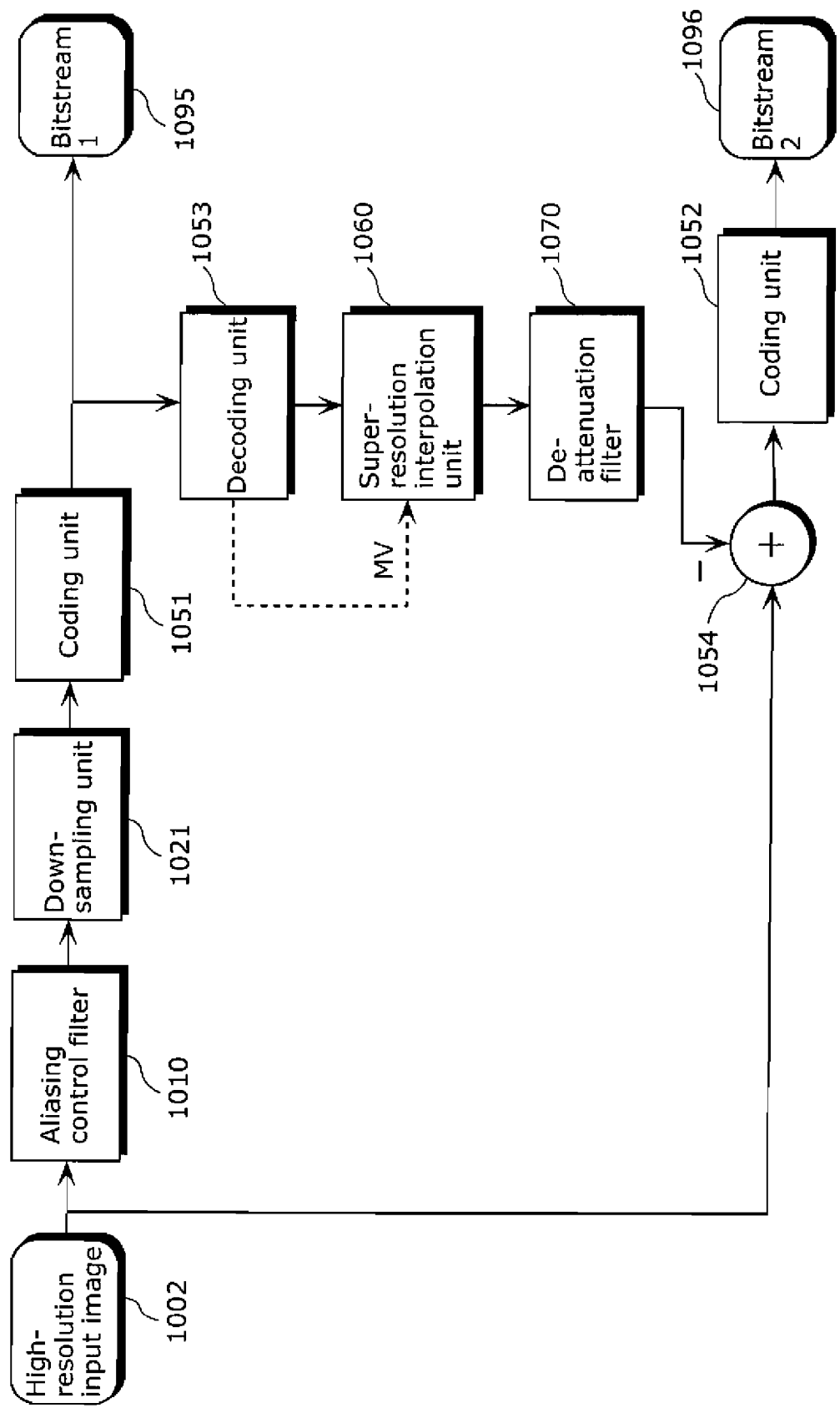
FIG. 15 is a block diagram showing the structure of a hierarchical video encoder according to the embodiment of the present invention.

FIG. 15 is a block diagram of the hierarchical structure of a video coding apparatus in the present invention. The digital high-resolution input image 1002 is filtered by the aliasing control filter 1010, and controls the amount of folding noise generated by the next down-sampling unit 1021. The down-sampling unit 1021 outputs low-resolution digital video signals by down-sampling the filtered input video signals. The down-sampled video signals can be applied to the display of a mobile device having a limited display capability. The coding unit 1051 codes the down-sampled video signals, and outputs, as bitstream 1 (1095), resulting compressed digital video signals. The coding unit 1051 may be a video encoder for transmission in accordance with the MPEG-2 or H. 264/MPEG4-AVC Standards. The present invention, however, is not limited to the specific type of encoder. Rather, the present invention can be applied to any type of encoder which codes a video signal into a digital bitstream.

The bitstream 1 is sent to an internal coding unit 1053 to generate a reference video signal. This reference video signal is sent to the super-resolution interpolation unit 1060 in order to reconstruct a high-resolution video signal from a compressed low-resolution bitstream 1. The high-resolution video signal generated from the super-resolution interpolation 1060 is filtered by the de-attenuation filter 1070.

Preferably, the resolution of the reconstructed signal corresponds to the resolution of the high-resolution input image 1002.

The use of super-resolution interpolation technique is disables the super-resolution interpolation unit 1060 to execute up-sampling on a frame-by-frame basis.

Instead, the reconstruction is based on images taken from a sequence of consecutive frames. Nevertheless, the reconstruction can be executed on a macro block level, i.e., the images may correspond to macro blocks from consecutive frames. Further, the super-resolution interpolation may exploit motion vectors estimated by a motion estimation/compensation unit that is generally a part of a video encoder. Preferably, the motion vector (MV) estimated by a first encoding unit 1051 or a second encoding unit 1052 may be used for the super-resolution interpolation. Alternatively, more precise motion vectors may be estimated by the super-resolution interpolation unit 1060.

An adder 1054 subtracts the reconstructed signal from the high-resolution input image 1002 in order to generate a difference signal containing the image information that could not be reconstructed from the compressed low-resolution video signal. The difference signal is fed to the second coding unit 1052 of a similar kind as the first coding unit 1051 in order to code the difference signal into a bitstream 2 (1096).

The high-resolution input image 1002 has thus been coded into the following compressed video signals: the bitstream 1 containing video information at a reduced resolution; the bitstream 2 containing the differences between the original video signal and a video signal reconstructed from the low-resolution signal by means of super-resolution interpolation and de-attenuation. The bitstream 1 is self-contained in the sense that it can be decoded independently, for instance, to mobile communication devices with limited displaying and/or computing capabilities. For this purpose, image quality can be optimized by means of the aliasing control filter 1010 that reduces the amount of folding noise.

Both bitstreams 1 and 2 may be multiplexed into a single bitstream thus forming a hierarchically coded compressed video signal corresponding to the high-resolution input image 1002. The multiplexed bitstreams may be transmitted or recorded irrespective of the display capabilities or a decoder. The multiplexed bitstreams represent the input signals at full resolution. Due to the super-resolution interpolation and de-attenuation processing, however, redundancies related to the high resolution have been eliminated thus enabling a high compression ratio without adversely affecting image quality.

The aliasing control filter 1010 thus allows optimization of the image quality of the low-resolution version of the video data on the one hand, and the overall coding efficiency of the full-resolution video data on the other hand. The stronger the attenuation of image frequencies exceeding the Nyquist frequency of the down-sampling unit 1021, the better the image quality of the low-resolution version since folding noise is suppressed. However, a too little amount of aliasing components impairs super-resolution interpolation, and thus deteriorates the prediction of the high-resolution video data from the low-resolution version. This leads to a larger difference signal at the adder 1054, and thus to more data that has to be coded in the bitstream 2.

Figure 5:
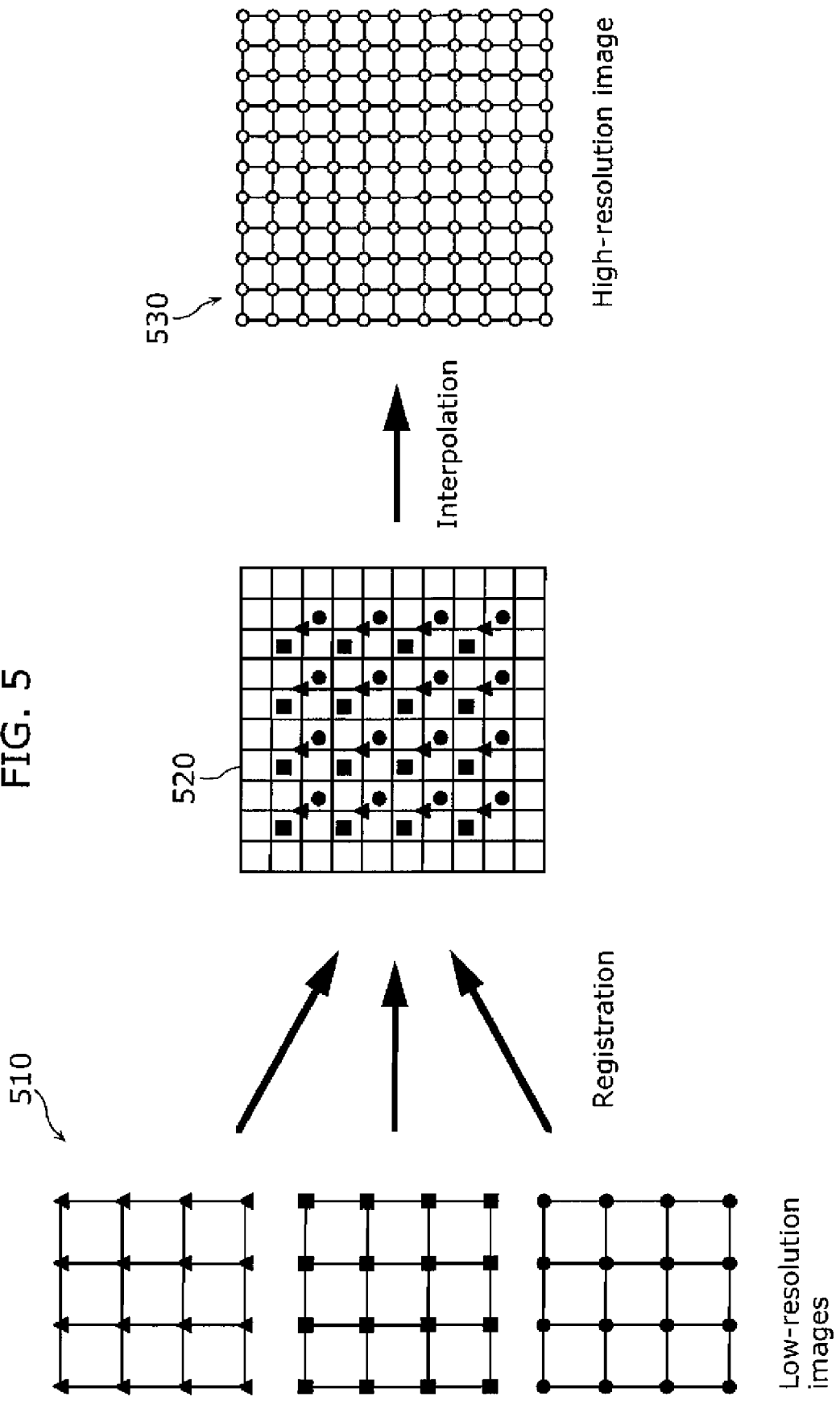
FIG. 5 is an illustration of the registration and interpolation in super-resolution reconstruction.
Figure 6A:
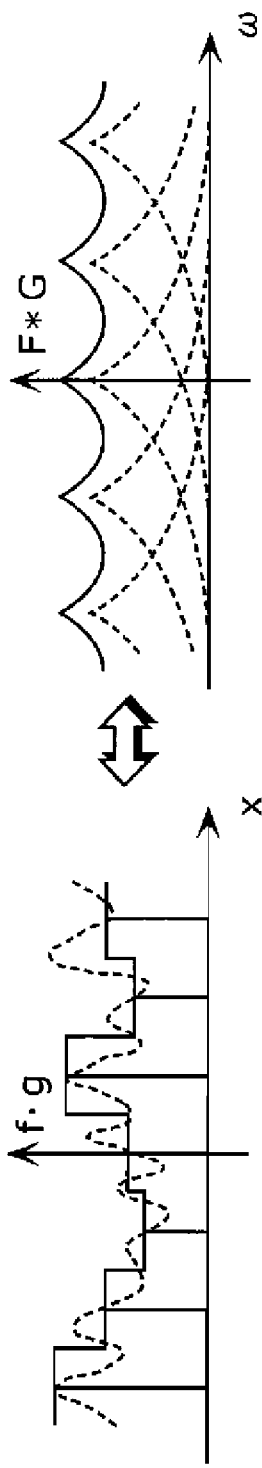
FIG. 6A is a diagram of a sampled input signal in a spatial domain and a frequency domain.
Figure 6B:
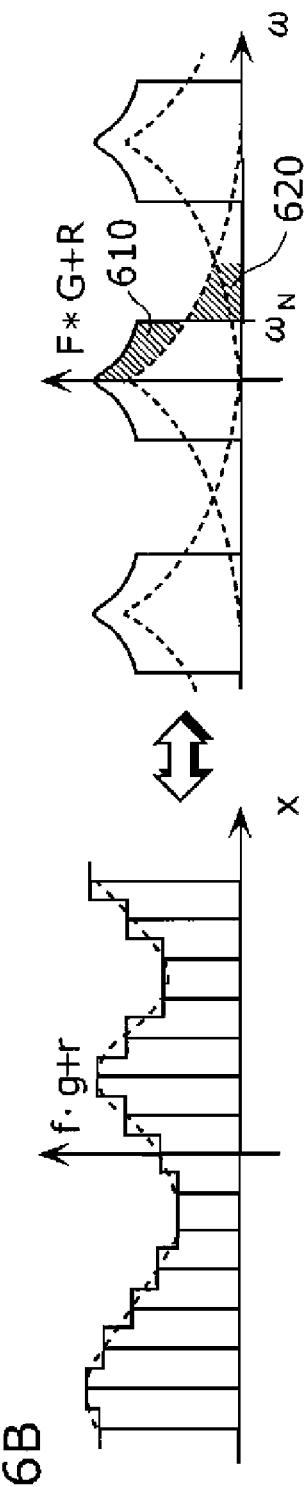
FIG. 6B is a diagram of a resolution-enhanced signal in the spatial domain and the frequency domain.
Figure 6C:
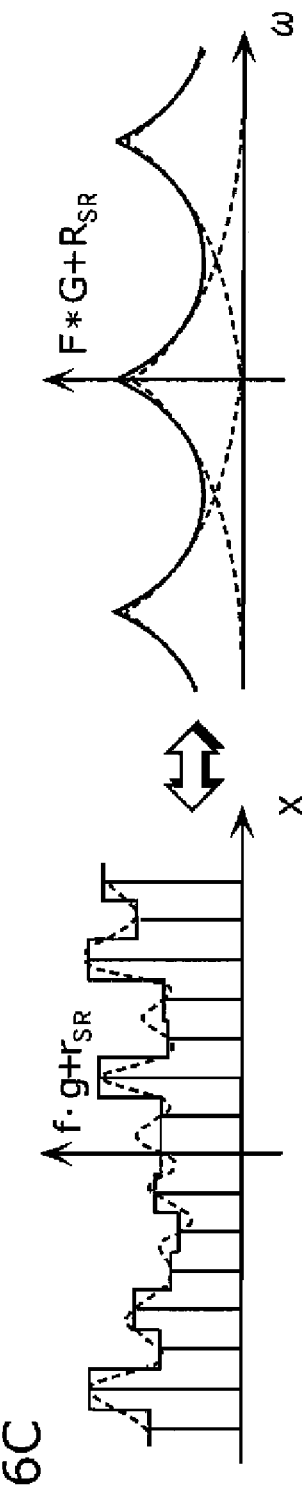
FIG. 6C is a diagram of a resolution-enhanced signal in the spatial and the frequency domain using super-resolution interpolation.
Figures 7A, 7B:
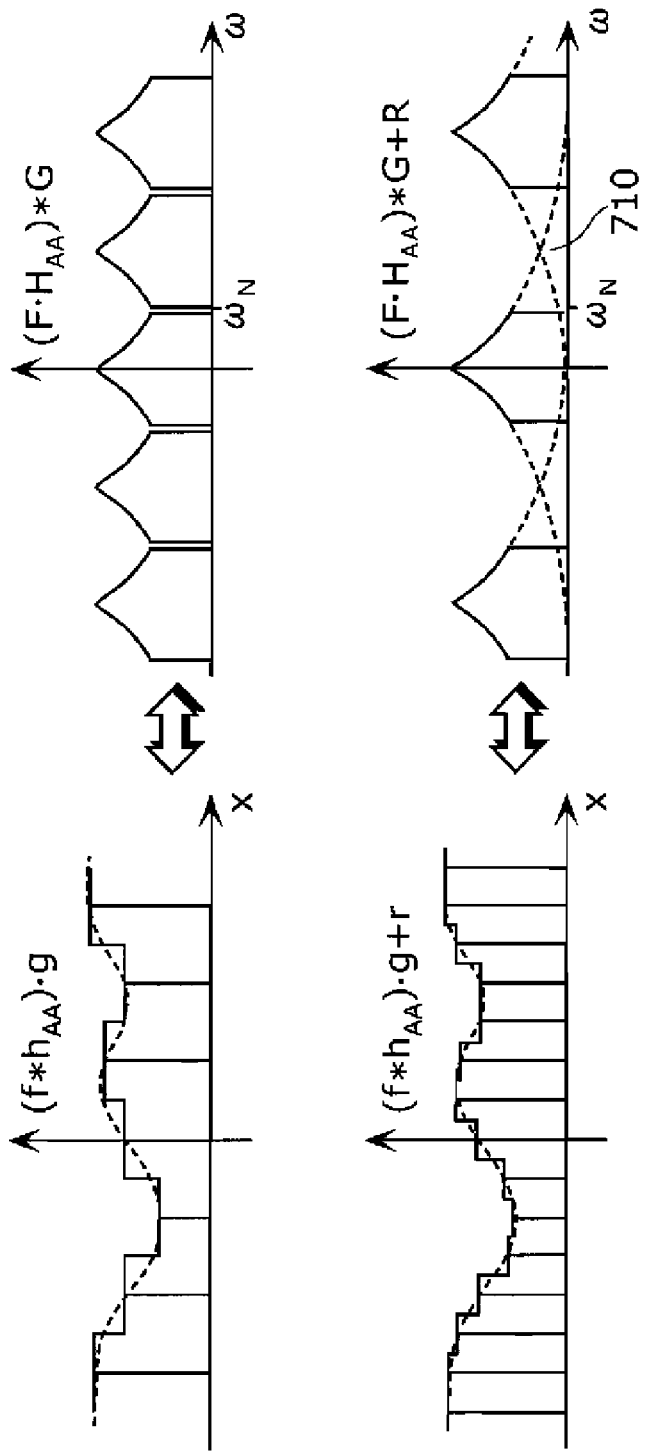
FIG. 7A is a diagram of an anti-aliasing filtered and sampled input signal in a spatial domain and a frequency domain.
FIG. 7B is a diagram of super-resolution interpolation applied to an anti-aliasing filtered and sampled input signal in the spatial domain and the frequency domain.
Figure 16:
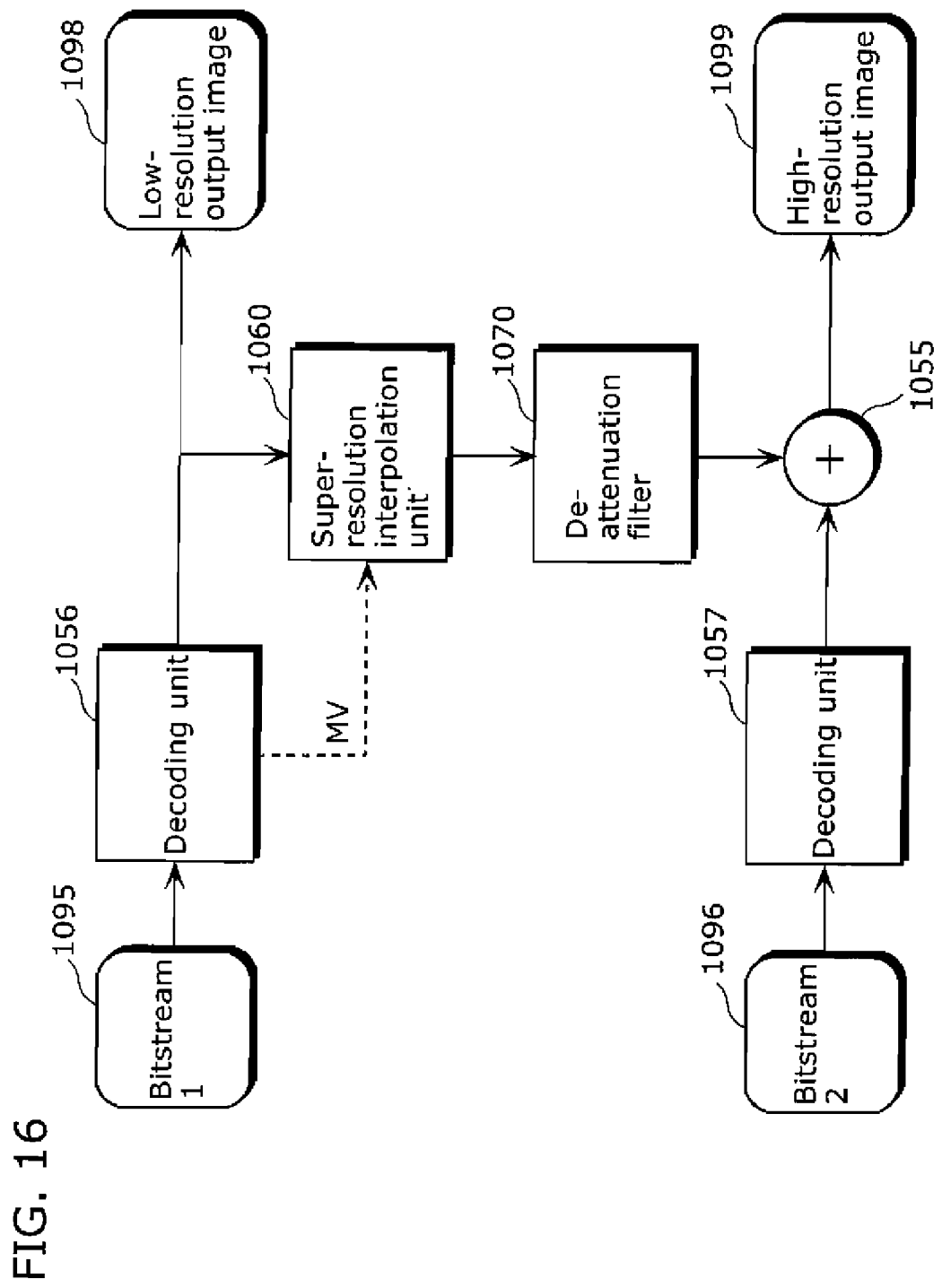
FIG. 16 is a block diagram showing the structure of a hierarchical video decoder according to the embodiment of the present invention.

FIG. 16 is a block diagram showing the structure of a video decoding apparatus according to the present invention. The bitstreams 1 and 2 (1095, 1096) outputted by the video coding apparatus are fed into respective decoding units 1056 and 1057. The low-resolution output image 1098 of the first decoding unit 1056 thus corresponds to the low-resolution version of the coded high-resolution input image 1002. The output of the first decoding unit 1056 is also fed into a super-resolution interpolation unit 1060 followed by a de-attenuation filter 1070 in order to reconstruct a high-resolution video signal from the low-resolution version. Preferably, the motion vector information (MV) required for decoding the bitstream 1 is also fed to the super-resolution interpolation unit 1060. Alternatively, more precise motion vectors may be estimated by the super-resolution interpolation unit 1060 itself. This motion vector may be exploited for registering the low-resolution images to the high-resolution grid as described in conjunction with FIG. 5. The output of the decoding unit 1057 represents the difference signals, and is added to the high-resolution video signals reconstructed by the adder 1055. This yields the decompressed high-resolution output image 1099 corresponding to the coded high-resolution input image 1002.

Depending on the displaying and computing capabilities of the decoding device, only the decoding unit 1056 may be mounted, and only the low-resolution images may be decoded. This achieves a reduction of cost for production and operation of the devices as well as in a reduction of circuit scale, etc.

On the other hand, the very same multiplexed bitstream may be decoded by high-quality decoding devices so as to reproduce the video signal at full resolution. Due to the super-resolution and de-attenuation processing, redundancies within the video data have been significantly reduced thus leading to an improved coding efficiency. The high-quality decoding device may thus reproduce the video signal by receiving and processing a fewer amount of encoded data than decoding devices operating with conventional video coding schemes.

As explained above, the optimum filter characteristics of the aliasing control filter 1010 may depend on the image content. Hence, it is advantageous to adapt the filtering characteristics of the aliasing control filter 1010 to the image content of the high-resolution input image 1002 in order to ensure that visible folding noise in the down-sampled video images are suppressed, while sufficient frequency components exceeding the Nyquist frequency remains available for super-resolution interpolation. Consequently, the filtering characteristics of the de-attenuation filter 1070 are preferably adapted as well. In a preferred embodiment, the video image is hence analyzed by an image analyzer (not shown) for setting the filter characteristics of the aliasing-control filter 1010 and the de-attenuation filter 1070 in real-time.

The optimum attenuation coefficient of the aliasing control filter 1010 may, for instance, depend on the amount of details contained within the input video. Especially, those details with image frequencies close to the Nyquist frequency are particularly sensitive to folding noise. The attenuation coefficient of the aliasing control filter 1010 may thus be controlled in accordance with the spectral power of the input video signal in a frequency range close to the Nyquist frequency.

In the setup of video coding apparatus and video decoding apparatus shown in FIGS. 15 and 16, the filtering characteristics that is employed by the de-attenuation filter 1070 in the video encoding apparatus may be signaled to the decoder. The filtering characteristics of the de-attenuation filter 1070 of the video decoding apparatus can thus be adapted accordingly in order to reproduce the high-resolution output image 1099.

Signaling of the filtering characteristics is performed by inserting signaling information in the bitstream 1096. The signaling information may comprise a full definition of the filter, e.g. in form of filter coefficients such as those of a finite impulse response filter, or certain parameters such as attenuation coefficient and threshold frequency.

The video coding apparatus according to the present invention includes an aliasing control filter 1010 which controls folding noise rather than removing it, and thereby achieving an enhanced image quality of a super-resolution image according to super-resolution interpolation technique. A preferred embodiment of the present invention relates to hierarchical video data compression and decompression with improved coding efficiency. The video data is coded into two bitstreams. The bitstream 1 is a self-contained representation of a low-resolution version of the video data. The bitstream 2 only contains the difference between the full-resolution video data and its super-resolution reconstruction.

As shown above, the image coding apparatus in the embodiment includes a de-attenuation filter 1070 having filter characteristics which are inverse to the filter characteristics of the aliasing control filter 1010 for enlarging video frequency of a high-resolution video signal attenuated by the aliasing control filter 1010. The adder 1054 subtracts the output of the de-attenuation filter from the original high-resolution input image, and outputs a difference signal, so that the subtracter 1054 outputs the difference. This increases the reproducibility of high-frequency components, yielding sharper images. In this way, the data amount which has to be coded in the bitstream 2 is decreased to an improved overall coding efficiency.

The filter characteristics of the aliasing control filter 1010 may be adaptively switched depending on the content of the high-resolution input image 15. This makes it possible to leave information for super-resolution interpolation as much as possible, and to suppress folding noise by means of a low-resolution digital video signal.

Preferably, the filter characteristics information of an aliasing control filter is signaled to the video decoding apparatus. It is only necessary that the filter characteristics information is inserted to the bitstream 2. The filter characteristics information may be a list of filter coefficients, and may include a limit frequency and an attenuation coefficient. By acquiring the characteristics of the de-attenuation filter 1070, the video decoding apparatus can decode high-resolution digital video signals.

Motion vector information estimated by the video decoding apparatus may be sent, as an input, to the super-resolution reconstruction unit, in order that the high-resolution video signal is reconstructed. Super-resolution interpolation requires information of sub-pixel motions in consecutive images. The information is extracted from motion vector information determined in advance in motion compensation. The calculation efficiency is improved in this way.

The image coding apparatus may further include a bitstream multiplexer which multiplexes the bitstream 1 and bitstream 2 into an output bitstream which displays an input video signal. In this way, the coded video data can be easily transmitted via a single communication path, or can be recorded onto a recording medium.

Preferably, at least one of these two coding units codes an input signal into a bitstream in accordance with the video compression standard. Such video encoder (for example, an MPEG-II or H.264/AVC encoder) is an implementation of an advanced technology, and provides the optimum performances and coding efficiency.

In addition, the video decoding apparatus in this embodiment decodes video data coded by the image coding apparatus which uses such de-attenuation filter 1070 in order to reconstruct high-resolution reference video signals. In this way, it is possible to achieve a high coding efficiency by efficiently removing redundancies in a current video signal to be coded.

Preferably, the filter characteristics of the de-attenuation filter is set according to the filter characteristics information signaled from an encoder. The filter characteristics information may extract the bitstream 2. The filter characteristics information may be a list of filter coefficients. The filter characteristics information may be a limit frequency and a de-attenuation coefficient. The video decoding apparatus can is adapt the de-attenuation in order to optimize the quality of the high-resolution digital video signals in this way.

Preferably, the motion vector information (MV) found by the decoding unit 1056 may be sent, as an input, to the super-resolution interpolation unit 160 in order that the high-resolution video signal is reconstructed. Super-resolution interpolation requires information of sub-pixel motions in consecutive images. The information is extracted from the motion vector information determined in motion compensation. The calculation efficiency is improved in this way.

Preferably, a bitstream de-multiplexer is provided. The bitstream de-multiplexer is user for de-multiplexing the bitstream 1 and the bitstream 2 from the input bitstream. In this way, it is easy to decode coded video data transmitted via a single transmission channel or recorded on a recording medium.

Preferably, at least one of these two decoding units decodes the input bitstream in accordance with the video compression standard. Note that each block diagram shown in the embodiment is typically implemented as the LSI that is an integrated circuit device. This LSI may be implemented on a single chip or on several chips. A block called as an LSI here may be called as an IC, a system LSI, a super LSI or an ultra LSI depending on the integration degree.

An integrated circuit is not necessarily implemented in a form of an LSI, it may be implemented in a form of an exclusive circuit or a general purpose processor. It is also possible to use the Field Programmable Gate Array (FPGA) that enables programming or a reconfigurable processor that can reconfigure the connection or setting of a circuit cell inside the LSI after generating an LSI.

Further, in the case where technique of implementing an integrated circuit that supersedes the LSI is invented along with the development in semiconductor technique or another derivative technique, as a matter of course, integration of the function blocks may be implemented using the invented technique. Bio technique is likely to be adapted.

Note that the main part may also be implemented by a processor or a program shown in the respective blocks of block diagrams.

The present invention is applicable to an image processing apparatus, a video coding apparatus, and a video decoding apparatus, and in particular applicable to a video recording and reproducing apparatus, a video camera, and a television camera.

The invention claimed is:

1. An image processing apparatus, comprising,
a filter unit configured to filter image signals;
a sampling unit configured to generate first digital image signals having a first resolution by sampling the filtered image signals at a predetermined sampling frequency; and
a super-resolution unit configured to reconstruct a second digital image signal having a second resolution which is higher than the first resolution by performing super-resolution interpolation on the first digital image signals generated by the sampling unit,
wherein the filter unit is configured to pass frequency components corresponding to or lower than a Nyquist frequency which is half the sampling frequency, and to pass a part of frequency components within a range from the Nyquist frequency to a highest frequency which can be represented by the second resolution.

2. The image processing apparatus according to claim 1, further comprising:
an inverse filter unit configured to have a filter characteristic which is inverse to a filter characteristic of the filter unit and to filter the second digital image signal.

3. The image processing apparatus according to claim 2, wherein the inverse filter unit is configured to attenuate the frequency components corresponding to or lower than the Nyquist frequency, and to pass the part of frequency components within the range from the Nyquist frequency to the highest frequency which can be represented by the second resolution.

4. The image processing apparatus according to claim 2, wherein the inverse filter unit is configured to pass the frequency components corresponding to or lower than the Nyquist frequency, and to emphasize frequency components corresponding to or higher than the Nyquist frequency.

5. The image processing apparatus according to claim 2, wherein the filter unit has a filter characteristic of having an attenuation slope in the range from the Nyquist frequency to the highest frequency, and has a filter characteristic of attenuating, to 0, a frequency component corresponding to the highest frequency.

6. The image processing apparatus according to claim 2, wherein the filter unit is switchable among filter characteristics including a first filter characteristic and a second filter characteristic,
an attenuation slope starting with the Nyquist frequency and ending with the highest frequency in the first filter characteristic is greater than an attenuation slope starting with the Nyquist frequency and ending with the highest frequency in the second filter characteristic, and
the filter unit is configured to select the first filter characteristic in the case where the number of high-frequency components included in the image signal is less than a threshold value, and to select the second filter characteristic in the case where the number of high-frequency components included in the image signal is greater than a threshold value.

7. The image processing apparatus according to claim 1, wherein the filter unit has a filter characteristic of having an attenuation slope in the range from the Nyquist frequency to the highest frequency, and has a filter characteristic of attenuating, to 0, a frequency component corresponding to the highest frequency.

8. The image processing apparatus according to claim 1, wherein the filter unit is switchable among filter characteristics including a first filter characteristic and a second filter characteristic,
an attenuation slope starting with the Nyquist frequency and ending with the highest frequency in the first filter characteristic is greater than an attenuation slope starting with the Nyquist frequency and ending with the highest frequency in the second filter characteristic, and
the filter unit is configured to select the first filter characteristic in the case where the number of high-frequency components included in the image signal is less than a threshold value, and to select the second filter characteristic in the case where the number of high-frequency components included in the image signal is greater than a threshold value.

9. The image processing apparatus according to claim 8, wherein the inverse filter unit is switchable among a first inverse filter characteristic which is inverse to the first filter characteristic and a second inverse filter characteristic which is inverse to the second filter characteristic, and
the inverse filter unit is configured to select one of the first inverse filter characteristic and the second inverse filter characteristic which corresponds to the selected one of the first filter characteristic and the second filter characteristic.

10. An image processing method comprising:
filtering image signals;
generating first digital image signals having a first resolution by sampling the filtered image signals at a predetermined sampling frequency; and reconstructing a second digital image signal having a second resolution which is higher than the first resolution by performing super-resolution interpolation on the first digital image signals generated by the sampling unit, wherein, in the filtering, frequency components corresponding to or lower than a Nyquist frequency which is half the sampling frequency are passed, and a part of frequency components within a range from the Nyquist frequency to a highest frequency which can be represented by the second resolution is passed.

11. A non-transitory computer-readable recording medium storing a program, the program causing a computer to execute steps comprising:

filtering image signals;

generating first digital image signals having a first resolution by sampling the filtered image signals at a predetermined sampling frequency; and reconstructing a second digital image signal having a second resolution which is higher than the first resolution by performing super-resolution interpolation on the first digital image signals generated by the sampling unit, wherein, in the filtering, frequency components corresponding to or lower than a Nyquist frequency which is half the sampling frequency are passed, and a part of frequency components within a range from the Nyquist frequency to a highest frequency which can be represented by the second resolution is passed.

12. A semiconductor integrated circuit, comprising:

a filter unit configured to filter image signals;

a sampling unit configured to generate first digital image signals having a first resolution by sampling the filtered image signals at a predetermined sampling frequency; and a super-resolution unit configured to reconstruct a second digital image signal having a second resolution which is higher than the first resolution by performing super-resolution interpolation on the first digital image signals generated by the sampling unit, wherein the filter unit is configured to pass frequency components corresponding to or lower than a Nyquist frequency which is half the sampling frequency, and to pass a part of frequency components within a range from the Nyquist frequency to a highest frequency which can be represented by the second resolution.

* * * * *